(12) United States Patent
Brandt et al.

(10) Patent No.: US 10,605,306 B2
(45) Date of Patent: Mar. 31, 2020

(54) TURBOCHARGER

(71) Applicant: MAN Energy Solutions SE, Augsburg (DE)

(72) Inventors: Sven Brandt, München (DE); Claudius Wurm, Augsburg (DE); Harald Denkel, Baar (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/191,619

(22) Filed: Nov. 15, 2018

(65) Prior Publication Data
US 2019/0145280 A1 May 16, 2019

(30) Foreign Application Priority Data
Nov. 16, 2017 (DE) .......... 10 2017 126 936

(51) Int. Cl.
*F16C 33/10* (2006.01)
*F16C 17/18* (2006.01)
(Continued)

(52) U.S. Cl.
CPC ........ *F16C 33/1045* (2013.01); *F01D 25/168* (2013.01); *F01D 25/18* (2013.01); *F02C 6/12* (2013.01); *F16C 17/18* (2013.01); *F05D 2220/40* (2013.01); *F05D 2240/52* (2013.01); *F05D 2260/98* (2013.01); *F16C 2360/24* (2013.01)

(58) Field of Classification Search
CPC .. F16C 2360/24; F16C 33/1045; F16C 17/18; F16C 33/1085; F01D 25/16; F01D 25/166; F01D 25/168; F01D 25/18; F01D 2240/52; F01D 2260/98; F01D 2220/40; F02C 6/12
See application file for complete search history.

(56) References Cited

U.S. PATENT DOCUMENTS 4,370,106 A * 1/1983 Lauterbach ............. F01D 25/16
384/126
4,789,253 A * 12/1988 Perego .................. F01D 25/164
384/517
(Continued)

FOREIGN PATENT DOCUMENTS

DE 102013002605 8/2014

*Primary Examiner* — Alan B Waits
(74) *Attorney, Agent, or Firm* — Cozen O'Connor

(57) ABSTRACT

A turbocharger, with a turbine a turbine housing and a turbine rotor, with a compressor with a compressor housing and a compressor rotor that is coupled to the turbine rotor via a shaft, with a bearing housing arranged between the turbine housing and the compressor housing, wherein both the turbine housing and also the compressor housing are connected to the bearing housing, with at least one bearing, via which the shaft is mounted in the bearing housing, wherein the respective bearing comprises a bearing bush arranged in the bearing housing, wherein between the bearing bush and the bearing housing a radially outer lubricating gap and between the bearing bush and the shaft a radially inner lubricating gap are formed, wherein the radially outer lubricating gap and the radially inner lubricating gap are suppliable with lubricating oil emanating from an oil supply main line independently of one another.

8 Claims, 3 Drawing Sheets

(51) Int. Cl.
*F01D 25/16* (2006.01)
*F01D 25/18* (2006.01)
*F02C 6/12* (2006.01)

(56) References Cited

U.S. PATENT DOCUMENTS

| | | | | |
|---|---|---|---|---|
| 5,169,242 | A | * 12/1992 | Blase | F01D 25/164 |
| | | | | 384/107 |
| 5,857,332 | A | * 1/1999 | Johnston | F01D 25/168 |
| | | | | 417/407 |
| 2008/0098735 | A1 | * 5/2008 | Gutknecht | F01D 25/166 |
| | | | | 60/605.3 |
| 2014/0219777 | A1 | * 8/2014 | Uneura | F01D 25/186 |
| | | | | 415/112 |

\* cited by examiner

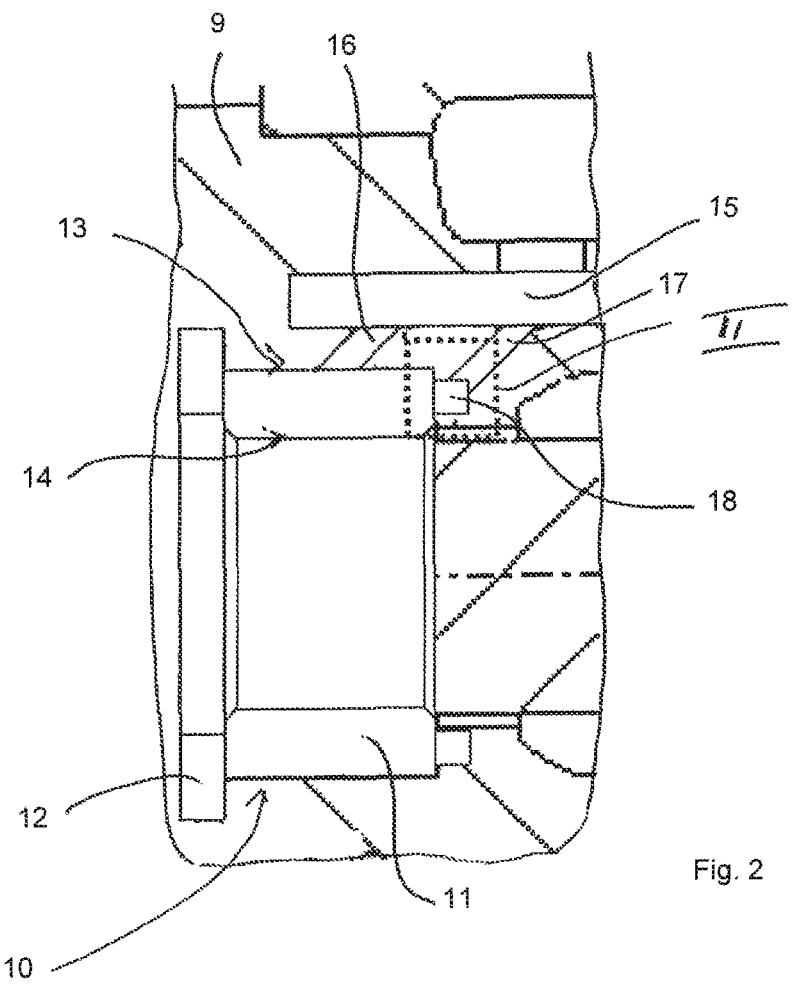
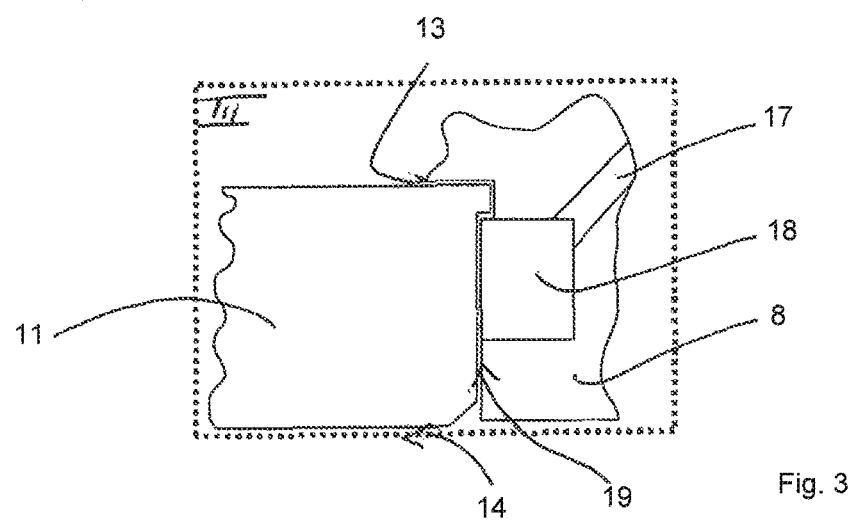
Fig. 2
Fig. 3

TURBOCHARGER

1. FIELD OF THE INVENTION

The invention relates to a turbocharger having bearing and particularly to the lubrication of said bearing.

2. BACKGROUND OF THE INVENTION

From DE 10 2013 002 605 A1, the content of which is hereby incorporated herein in its entirety, the fundamental construction of a turbocharger is known. A turbocharger comprises a turbine in which a first medium is expanded. A turbocharger, furthermore, comprises a compressor in which a second medium is compressed, namely utilizing the energy extracted in the turbine during the expansion of the first medium. The turbine of the turbocharger comprises a turbine housing and a turbine rotor. The compressor of the turbocharger comprises a compressor housing and a compressor rotor. Between the turbine housing of the turbine and the compressor housing of the compressor, a bearing housing is positioned, wherein the bearing housing on the one hand is connected to the turbine housing and on the other hand to the compressor housing. In the bearing housing, a shaft is mounted via which the turbine rotor is coupled to the compressor rotor.

From practice it is known that the shaft which couples the turbine rotor of the turbine to the compressor rotor of the compressor is mounted in the bearing housing via at least one bearing. The respective bearing of the bearing housing for mounting the shaft comprises a bearing bush, which can either be mounted in a rotationally fixed manner or rotate in the bearing housing. The present invention relates to a turbocharger, in the case of which in the region of at least one bearing of the bearing housing, the bearing bush of the bearing is mounted in the bearing housing in a rotationally fixed manner. Between the bearing housing and the bearing bush a radially outer lubricating gap and between the bearing bush and the shaft a radially inner lubricating gap are formed. The radially outer lubricating gap formed between the bearing housing and the bearing bush is also referred to as squeeze film dampers.

In turbochargers known from practice, the radially outer lubricating gap and the radially inner lubricating gap, which are formed between the bearing bush and the bearing housing or the shaft, are suppliable with lubricating oil from an oil supply main line dependent on one another, namely in such a manner that emanating from the oil supply main line the lubricating oil can be fed via at least one line to the radially outer lubricating gap between the bearing bush and the bearing housing, and that via at least one further line introduced into the bearing bush the lubricating oil emanating from the radially outer lubricating gap can be fed to the radially inner lubricating gap which is formed between the bearing bush and the shaft. Since according to practice the radially inner lubricating gap, emanating from the radially outer lubricating gap, is supplied with lubricating oil the functionality of the outer lubricating gap is negatively affected.

SUMMARY OF THE INVENTION

According to the present invention, the radially outer lubricating gap of the bearing bush and the radially inner lubricating gap of the bearing bush are suppliable with lubricating oil emanating from an oil supply main line independently of one another. Accordingly, the inner lubricating gap is not supplied with lubricating oil emanating from the outer lubricating gap but rather emanating from the oil supply main line. There is then no risk that through the oil supply of the radially inner lubricating gap the functionality of the radially outer lubricating gap is negatively affected. On the contrary, the radially outer lubricating gap can optimally perform its function as squeeze film damper.

Preferentially, the radially outer lubricating gap is suppliable with lubricating oil via at least one first line branching off the oil supply main line, wherein the radially inner lubricating gap is suppliable with lubricating oil via at least one second line branching off the oil supply main line. This embodiment is preferred in order to supply the radially inner lubricating gap with lubricating oil emanating from the oil supply main line independently of the radially outer lubricating gap.

According to an advantageous further development of the invention, the or each first line opens into the radially outer lubricating gap radially outside, wherein the or each second line on an axial side of the bearing bush opens into an annular passage of the bearing housing. Emanating from the annular passage formed on the axial side of the bearing bush, the lubricating oil can easily and reliably enter the region of the inner lubricating gap.

According to a first embodiment of the present invention, the lubricating oil, emanating from the annular passage, enters the region of the radially inner lubricating gap via an axial gap between the bearing bush and the bearing housing. This embodiment of the invention is particularly simple in terms of design. Bores in the bearing bush can be dispensed with.

According to a second, alternative embodiment of the invention, at least one line is introduced into the bearing bush via which the lubricating oil, emanating from the annular passage, enters the region of the radially inner lubricating gap. Preferentially, the or each line introduced into the bearing bush is set at an incline relative to the axial direction and/or relative to the radial direction of the bearing bush. This embodiment of the invention is more expensive in terms of the design but the radially inner lubricating gap can be better supplied with lubricating oil emanating from the annular passage than in the first version.

BRIEF DESCRIPTION OF THE DRAWINGS

Exemplary embodiments of the invention are explained in more detail by way of the drawing in which:

FIG. 2 is a cross sectional through a first turbocharger according to the invention in the region of a bearing of the bearing housing;

FIG. 3 is a view of the detail III of FIG. 2;

DETAILED DESCRIPTION OF THE PRESENTLY PREFERRED EMBODIMENTS

Figure 1:
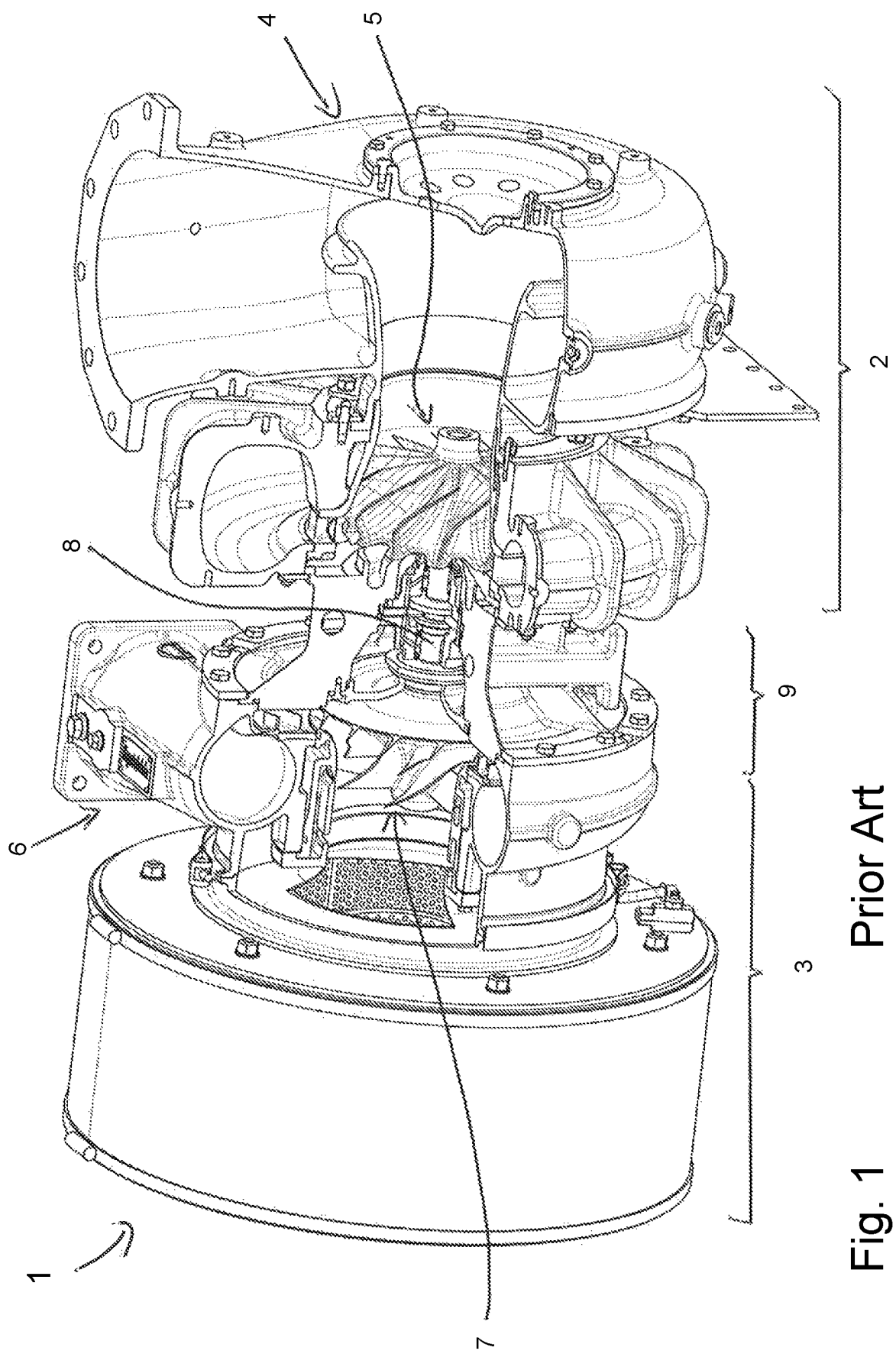
FIG. 1 is a cross sectional view through a turbocharger according to the prior art.

A turbocharger 1 comprises a turbine 2 for expanding a first medium, in particular for expanding exhaust gas of an internal combustion engine. Furthermore, a turbocharger 1 comprises a compressor 3 for compressing a second medium, in particular charge air, namely utilizing energy extracted in the turbine 2 during the expansion of the first medium.

The turbine 2 comprises a turbine housing 4 and a turbine rotor 5. The compressor 3 comprises a compressor housing 6 and a compressor rotor 7. The compressor rotor 7 is coupled to the turbine rotor 5 via a shaft 8, which is mounted in a bearing housing 9, wherein the bearing housing 9 is positioned between the turbine housing 4 and the compressor housing 5 and connected both to the turbine housing 4 and to the compressor housing 5.

The shaft 8, which couples the compressor rotor 7 and the turbine rotor 5 to one another, is rotatably mounted in the bearing housing 9 via at least one bearing 10 of the bearing housing 9, in particular such a bearing 10 for mounting the shaft 8 is present in each case on a section of the shaft 8 facing the turbine rotor 5 and a section of the shaft 8 facing the compressor rotor 7.

FIG. 2, 3 show details of a turbocharger according to the invention in the region of such a bearing 10 of the bearing housing 9. The bearing 10 comprises a bearing bush 11, which via means which are not shown in FIG. 2, 3 are mounted in the bearing housing 9 in a rotationally fixed manner or on the bearing housing 9 in a rotationally fixed manner. Accordingly, the bearing bush 11 in the shown exemplary embodiment represents a housing-fixed component. According to FIG. 2, 3, the bearing bush 11, seen in the axial direction, is fixed in its axial position between the bearing housing 9 and a cover 12. It is pointed out that it is also possible that the bearing bush 11 is not mounted in the housing 11 in a rotationally fixed manner but can rather rotate.

Between the bearing housing 9 and the bearing bush 11 arranged in the bearing housing 9 a radially outer lubricating gap 13 is formed, which functions as squeeze oil damper. Furthermore, a radially inner lubricating gap 14 is formed between the shaft 8 which is not shown in FIG. 2, 3 and the bearing bush 11.

According to the invention, the radially outer lubricating gap 13 and the radially inner lubricating gap 14 are supplied with lubricating oil emanating from an oil supply main line 15 of the bearing housing 9 independently of one another. Accordingly, according to FIG. 2, 3, at least one first line 16 branches off the oil supply main line 15, via which oil, emanating from the oil supply main line 15, can be fed to the radially outer lubricating gap 13. From the oil supply main line 15, at least one second line 17 additionally branches off, via which the radially inner lubricating gap 14 can be supplied with lubricating oil emanating from the oil supply main line 15.

In the exemplary embodiment shown in FIG. 2, 3, the or each first line 16, which serves for supplying the outer lubricating gap 13 with oil, opens into the radially outer lubricating gap 13 radially outside. The or each second line 17, which serves for the oil supply of the radially inner lubricating gap 14, opens into an annular passage 18 of the bearing housing 9 on an axial end or on an axial side of the bearing bush 11, namely on the side of the bearing bush 11 located opposite the cover 12.

This annular passage 18 is circumferentially introduced into the bearing housing 9 in the circumferential direction, namely axially laterally next to the bearing bush 11 on the side of the bearing bush 11 located opposite the cover 12.

In the exemplary embodiment shown in FIG. 2, 3, the lubricating oil, emanating from this annular passage 18, enters the region of the radially inner lubricating gap 14 via an axial gap 19 between the bearing bush 11 and the bearing housing 9. Bores in the bearing bush 11 can thus be completely omitted.

Figure 4:
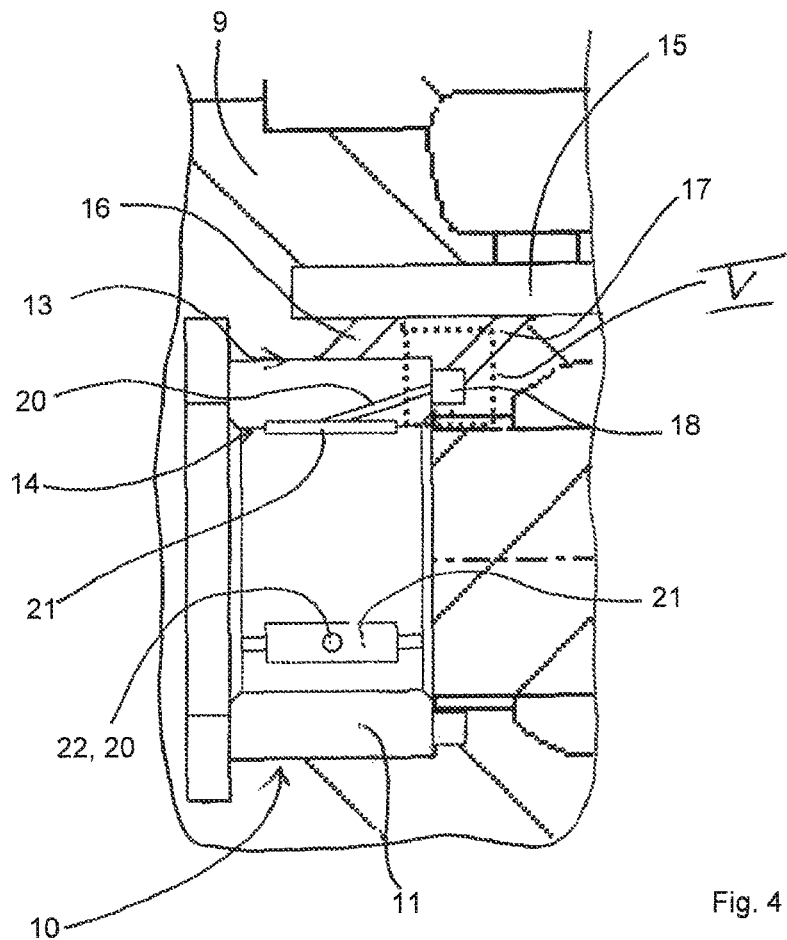
FIG. 4 is a cross sectional view through a second turbocharger according to the invention in the region of a bearing of the bearing housing.
Figure 5:
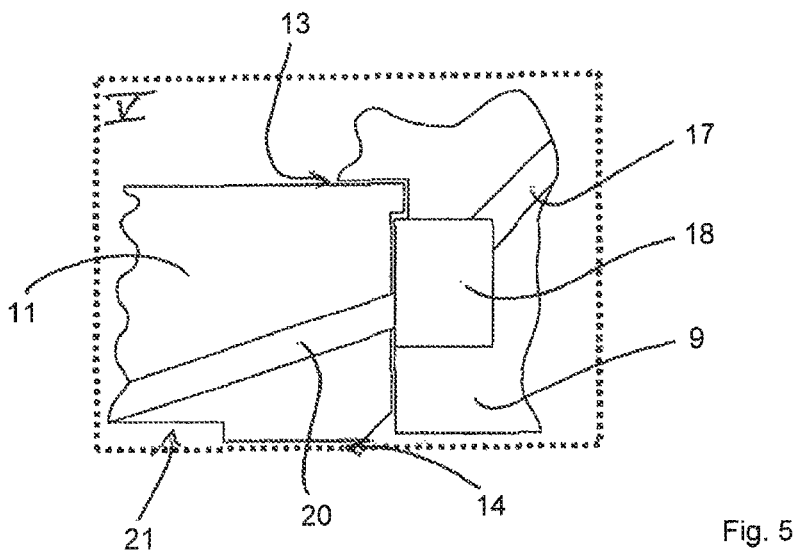
FIG. 5 is a view of the detail V of FIG. 4.

FIG. 4, 5 shows an alternative configuration of a bearing 10 of a turbocharger 1 according to the invention, wherein the exemplary embodiment of FIG. 4, 5 differs from the exemplary embodiment of FIG. 2, 3 in that the lubricating oil, emanating from the annular passage 18, can be fed to the radially inner lubricating gap 14 via at least one line 20 introduced into the bearing bush 11, which, emanating from the annular passage 18, extends into the region of the radially inner lubricating gap 14 where it opens into the region of a lubricating oil pocket 21 which is formed on a radially inner surface of the bearing bush 11.

Here, the or each line 20 introduced into the bearing bush 11 is set at an incline relative to the axial direction of the bearing bush 11 and/or relative to the radial direction of the bearing bush 11.

According to the invention, the radially outer lubricating gap 13 and the radially inner lubricating gap 14 of a bearing bush 11 of a bearing 10 of a bearing housing 9 of a turbocharger 1 are accordingly suppliable with lubricating oil independently of one another via separate lines 16, 17 emanating from an oil supply main line 15. There is no risk that through the supply of the radially inner lubricating gap 14 with lubricating oil the functionality in the region of the outer lubricating gap 13 is negatively affected. The or each second line 17, via which the radially inner lubricating gap 14 is supplied with lubricating oil emanating from the oil supply main line 15, opens into the annular passage 18, which is formed on the bearing housing 9, wherein emanating from this annular passage 18 lubricating oil can be fed to the inner lubricating gap 14 preferentially via lines 20 introduced into the bearing bush 11, namely in the region of lubricating oil pockets 21.

In the shown exemplary embodiment, the lines 20, which are introduced into the bearing bush 11, open into the respective lubricating oil pocket 21 in such a manner that the mouth opening 22 of the respective line 20 in the region of the respective lubricating oil pocket 21 approximately lies in the axial middle of the bearing bush 11.

The invention can be utilized on all types of turbochargers in which in the region of the bearing housing 9 at least one bearing 10 with a housing-fixed bearing bush 11 is embodied. The invention is independent of the design embodiment of the turbocharger, i.e. independent of whether the same utilizes a radial turbine or an axial turbine. Furthermore, the invention is independent on the concrete configuration of the compressor and of the internal combustion engine, on which the turbocharger is employed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A turbocharger comprising:
a turbine for expanding a first medium, the turbine comprising a turbine housing and a turbine rotor,
a compressor for compressing a second medium utilizing energy extracted in the turbine during expansion of the first medium, the compressor comprising a compressor housing and a compressor rotor coupled to the turbine rotor via a shaft,
a bearing housing arranged between the turbine housing and the compressor housing, the turbine housing and the compressor housing connected to the bearing housing,
at least one bearing for mounting the shaft in the bearing housing, the bearing comprising a bearing bush arranged in the bearing housing, wherein between the bearing bush and the bearing housing a radially outer lubricating gap and between the bearing bush and the shaft a radially inner lubricating gap is formed,
an oil supply main line for supplying the radially outer lubricating gap and the radially inner lubricating gap with lubricating oil emanating from the oil supply main line independently of one another,
an annular passage in the bearing housing, the annular passage being configured to receive lubricating oil from the oil supply main line, and
at least one bearing bush line introduced into the bearing bush, the at least one bearing bush line being configured to supply the lubricating oil received by the annular passage to the region of the radially inner lubricating gap.

2. The turbocharger according to claim 1, additionally comprising at least one first line branching off the oil supply main line for supplying the radially outer lubricating gap with lubricating oil and additionally comprising at least one second line branching off the oil supply main line for supplying the annular passage with lubricating oil.

3. The turbocharger according to claim 2, wherein the first line opens into the radially outer lubricating gap.

4. The turbocharger according to claim 3, wherein the second line on an axial side of the bearing bush opens into the annular passage of the bearing housing.

5. The turbocharger according to claim 2, wherein the second line on an axial side of the bearing bush opens into the annular passage of the bearing housing.

6. The turbocharger according to claim 5, wherein the lubricating oil from the annular passage enters the region of the radially inner lubricating gap via an axial gap between the bearing bush and the bearing housing.

7. A turbocharger comprising:
a turbine for expanding a first medium, the turbine comprising a turbine housing and a turbine rotor,
a compressor for compressing a second medium utilizing energy extracted in the turbine during expansion of the first medium, the compressor comprising a compressor housing and a compressor rotor coupled to the turbine rotor via a shaft,
a bearing housing arranged between the turbine housing and the compressor housing, the turbine housing and the compressor housing connected to the bearing housing,
at least one bearing for mounting the shaft in the bearing housing, the bearing comprising a bearing bush arranged in the bearing housing, wherein between the bearing bush and the bearing housing a radially outer lubricating gap and between the bearing bush and the shaft a radially inner lubricating gap is formed,
an oil supply main line for supplying the radially outer lubricating gap and the radially inner lubricating gap with lubricating oil emanating from the oil supply main line independently of one another,
at least one first line branching off the oil supply main line for supplying the radially outer lubricating gap with lubricating oil and additionally comprising at least one second line branching off the oil supply main line for supplying the radially inner lubricating gap with lubricating oil, wherein the second line on an axial side of the bearing bush opens into an annular passage of the bearing housing, and
at least one line introduced into the bearing bush, the lubricating oil emanating from the annular passage entering the region of the radially inner lubricating gap via the at least one line.

8. The turbocharger according to claim 7, wherein the at least one line introduced into the bearing bush is set at an incline relative to an axial direction of the bearing bush.

* * * * *